(12) United States Patent
Collins et al.

(10) Patent No.: US 12,421,883 B2
(45) Date of Patent: Sep. 23, 2025

(54) SERPENTINE HEATERS HAVING FEATURES TO REDUCE HOT SPOTS AT SLOT ENDS

(71) Applicant: CORNING INCORPORATED, Corning, NY (US)

(72) Inventors: Thomas Adam Collins, Bradford, NY (US); David Robert Heine, Seminole, FL (US); Avinash Tukaram Shinde, Irving, TX (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/287,199

(22) PCT Filed: Apr. 26, 2022

(86) PCT No.: PCT/US2022/026368
§ 371 (c)(1),
(2) Date: Oct. 17, 2023

(87) PCT Pub. No.: WO2022/235460
PCT Pub. Date: Nov. 10, 2022

(65) Prior Publication Data
US 2024/0209761 A1 Jun. 27, 2024

Related U.S. Application Data

(60) Provisional application No. 63/319,374, filed on Mar. 13, 2022, provisional application No. 63/183,573, filed on May 3, 2021.

(30) Foreign Application Priority Data

Nov. 30, 2021 (IN) .............................. 202111055328

(51) Int. Cl.
*F01N 3/20* (2006.01)
*F01N 3/28* (2006.01)

(52) U.S. Cl.
CPC ......... *F01N 3/2026* (2013.01); *F01N 3/2803* (2013.01); *F01N 2240/16* (2013.01)

(58) Field of Classification Search
CPC .. F01N 2240/16; F01N 3/2006; F01N 3/2026; F01N 3/2803; F01N 3/2828
See application file for complete search history.

(56) References Cited

U.S. PATENT DOCUMENTS

| 5,202,547 A | 4/1993 | Abe et al. |
| 5,800,787 A | 9/1998 | Kato et al. |
| 2021/0404363 A1* | 12/2021 | Richard ................ F01N 3/2026 |

FOREIGN PATENT DOCUMENTS

| DE | 102012109391 A1 | 4/2014 |
| EP | 0452125 A2 | 10/1991 |

(Continued)

OTHER PUBLICATIONS

International Search Report and Written Opinion of the International Searching Authority; PCT/US2022/026368; mailed on Jul. 6, 2022, 11 pages; European Patent Office.

(Continued)

*Primary Examiner* — Anthony Ayala Delgado
(74) *Attorney, Agent, or Firm* — Kurt R. Denniston

(57) ABSTRACT

A heater body including an outer periphery. A plurality of slots extend from the outer periphery and terminate within the heater body. A plurality of core segments are defined between pairs of adjacent slots. A plurality of bend regions are arranged around respective terminal ends of the slots. Each pair of adjacent core segments is connected by a corresponding one of the bend regions. An auxiliary conductive feature is located within each of the bend regions. The plurality of slots electrically disconnect each pair of adjacent core segments from each other to create a serpentine current-carrying path that extends across the heater body through the electrically conductive material of the core (Continued)

segments and the bend regions. Each of the auxiliary conductive features locally reduces an electrical resistance of the heater body in the bend regions in comparison to the electrically conductive material alone.

14 Claims, 12 Drawing Sheets

(56) References Cited

FOREIGN PATENT DOCUMENTS

| | | |
|---|---|---|
| JP | 04-277481 A | 10/1992 |
| JP | 08-273805 A | 10/1996 |
| WO | 93/21430 A1 | 10/1993 |

OTHER PUBLICATIONS

Japanese Patent Application No. 2023-567196, Office Action dated Jan. 15, 2025, 4 pages (English Translation only), Japanese Patent Office.

* cited by examiner

SERPENTINE HEATERS HAVING FEATURES TO REDUCE HOT SPOTS AT SLOT ENDS

This is a national stage application under 35 U.S.C. § 371 of International Application No. PCT/US2022/026368, filed on Apr. 26, 2022, which claims the benefit of priority under 35 U.S.C. § 119 of U.S. Provisional Application Ser. No. 63/319,374 filed on Mar. 13, 2022, which claims the benefit of priority under 35 U.S.C. § 119 of Indian Patent Application number 202111055328 filed on Nov. 30, 2021, which claims the benefit of priority of U.S. Provisional Application Ser. No. 63/183,573 filed on May 3, 2021, the contents of which are relied upon and incorporated herein by reference in their entireties.

FIELD

This disclosure relates to heater assemblies that comprise honeycomb bodies, in particular honeycomb bodies having serpentine current-carrying paths defined by slots extending into the honeycomb bodies, and exhaust aftertreatment systems comprising such heater assemblies.

BACKGROUND

Pollution abatement systems, such as exhaust aftertreatment systems coupled to an internal combustion engine, e.g., that of an automobile or other vehicle, may include heater assemblies to provide supplemental heat in order to assist in operation of the system. For example, catalyst materials used in catalytic converters or other catalyst-containing aftertreatment components may require a sufficient minimum temperature to initiate catalytic reaction, which may be referred to as catalyst light off.

In the case of internal combustion engines, heat can also be supplied from the exhaust flow itself, but it may take some amount of time for the exhaust temperature to raise sufficient each time the engine is first turned on, which may be referred to as cold start of the engine. Even if the system is arranged for the exhaust flow to heat the catalyst to its light off temperature within a few seconds, these first few seconds after a cold start can contribute significantly to the overall emissions of the engine, and may even constitute the majority of emissions of the engine. Accordingly, supplemental heat provided by a heater assembly can considerably reduce the time it takes for the catalyst light off temperature is achieved, thereby reducing emissions, particularly after cold start events.

SUMMARY

Disclosed herein are heater bodies, such as for exhaust aftertreatment assemblies. In embodiments, the heater body comprises an outer periphery; a plurality of slots, each slot extending from the outer periphery and terminating at a terminal end within the heater body, a plurality of core segments comprised of an electrically conductive material, each core segment defined between a different pair of adjacent slots; a plurality of bend regions comprised of the electrically conductive material, wherein each of the bend regions is arranged around a respective one of the terminal ends of the slots, and wherein each pair of adjacent core segments is connected by a corresponding one of the bend regions; and an auxiliary conductive feature located within each of the bend regions proximate to the respective one of the terminal ends; wherein the plurality of slots electrically disconnect each pair of adjacent core segments from each other to create a serpentine current-carrying path that extends across the heater body through the electrically conductive material of the core segments and the bend regions, and wherein each of the auxiliary conductive features locally reduces an electrical resistance of the heater body in the bend regions in comparison to the electrically conductive material alone.

In embodiments, each auxiliary conductive feature comprises filleted or radiused corners at the terminal ends of the slots.

In embodiments, the electrically conductive material is shaped as a foam, a lattice, or from interwoven fibers, filaments, or wires that form a plurality of flow paths axially through the heater body.

In embodiments, the electrically conductive material is shaped as an intersecting array of walls that define a plurality of cells in a honeycomb design.

In embodiments, each auxiliary conductive feature comprises one or more of the cells in the bend region completely filled with supplemental electrically conductive material.

In embodiments, each auxiliary conductive feature comprises one or more of the cells in the bend region at least partially filled with supplemental electrically conductive material.

In embodiments, each auxiliary conductive feature comprises a continuous strip of supplemental electrically conductive material.

In embodiments, the strip comprises a plurality of wedges, each wedge partially filling a corresponding one of the cells.

In embodiments, the wedges have a linear slope.

In embodiments, the wedges are scalloped having a non-linear slope.

In embodiments, the wedges increase in width across each cell from a minimum dimension of 0%-25% of a cell width to a maximum dimension of 25%-100% the cell width.

In embodiments, each auxiliary conductive feature comprises a continuous strip of thickened walls that are thicker than the interesting walls.

In embodiments, the thickened walls comprise multiple arms extending from the bend region toward each core segment.

In embodiments, each auxiliary conductive feature comprises a thickened border wall bordering the terminal end of the slot.

In embodiments, each auxiliary conductive feature extends at least partially along a length of the slots.

In embodiments, each auxiliary conductive feature extends at least partially along the length of the slots on both opposite sides of the slots.

In embodiments, at least a portion of each auxiliary conductive feature that extends at least partially along the length of the slots is also spaced away from the slot.

In embodiments, the electrically conductive material is shaped as an intersecting array of walls that define a plurality of cells in a honeycomb design and the portion of each auxiliary conductive feature is spaced away from the slot by at least one cell width.

In embodiments, the auxiliary conductive feature extends continuously from a first core segment of the plurality of core segments through the bend region and to a second of the core segments of the plurality of core segments.

In embodiments, a heater assembly comprises the heater body of any one of the preceding paragraphs coupled to a pair of electrodes at opposite ends of the serpentine path.

In embodiments, an exhaust aftertreatment assembly comprising the heater assembly of the preceding paragraph and an aftertreatment component are connected in a common housing or piping.

In embodiments, the aftertreatment component comprises a porous ceramic honeycomb body.

In embodiments, the heater body, the aftertreatment component, or both, comprise a catalyst material.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
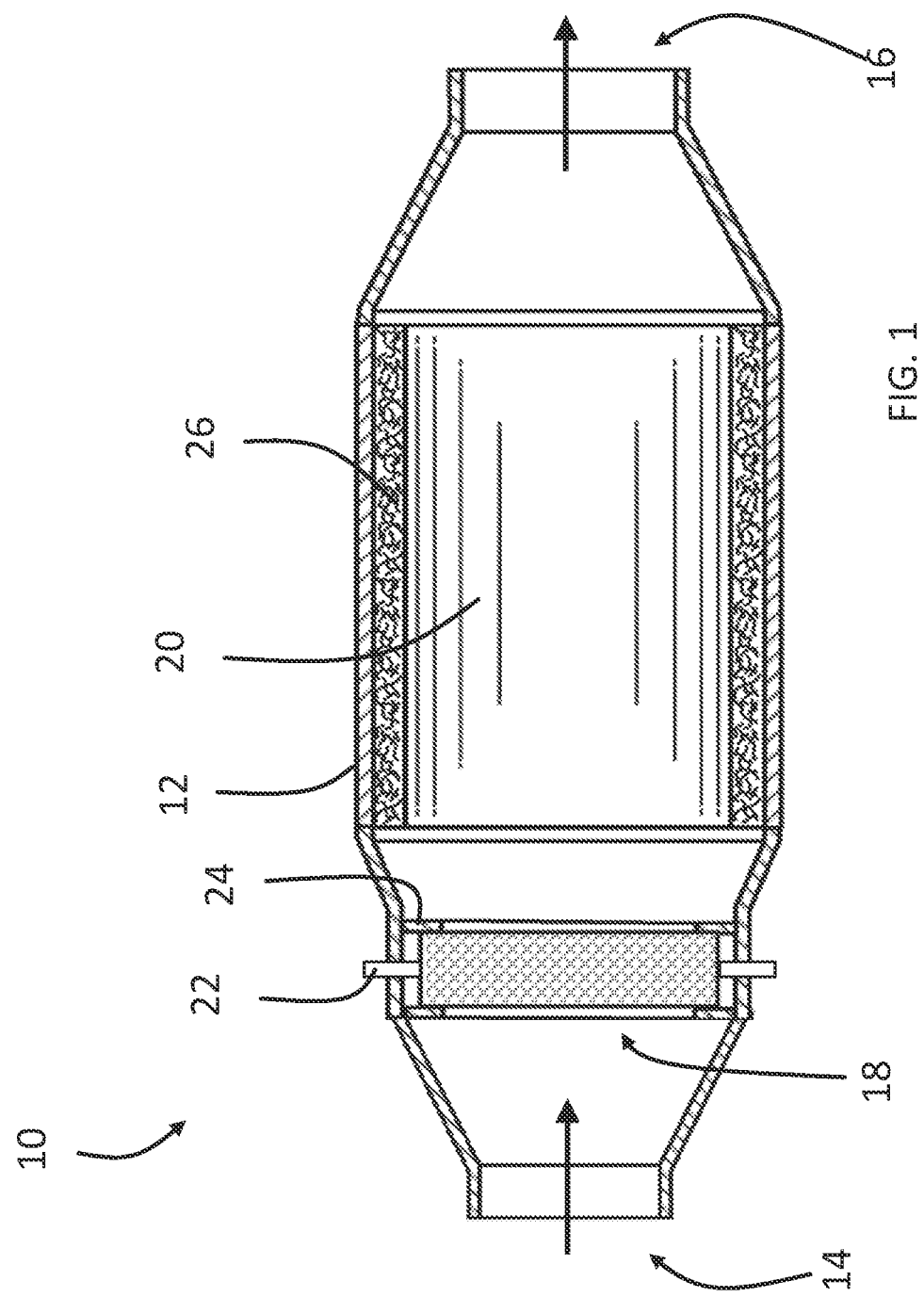
FIG. 1 is cross-sectional side view of an exhaust aftertreatment assembly according to embodiments disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

Modifications of the disclosure will occur to those skilled in the art and to those who make or use the disclosure. Therefore, it is understood that the embodiments shown in the drawings and described herein are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to also include the specific value or end-point referred to.

Directional terms as used herein—for example up, down, right, left, front, back, top, bottom—are made only with reference to the figures as drawn and are not intended to imply absolute orientation. As used herein, the term "radial" refers to directions perpendicular to the indicated axial direction that extend from the center point (e.g., see center axis C in FIG. 2) of a shape to or toward the outer perimeter of the shape, regardless of the shape of the component or feature with respect to which the radial direction is used. Similarly, the term "diameter" as used herein is not limited to circular shapes, but instead refers to the longest dimension of a component that passes through the center point (center axis) of the shape of that component. For example, a radial distance of a square-shaped component can be measured as the straight-line distance from the center point (center axis) to an intersection with one of the walls of the square, while the diameter of a square refers to the longest dimension diagonally across the square. The terms "cross-sectional width" or "cross-sectional dimension" may also be used to refer to these directions perpendicular to the axial direction.

Fluid treatment systems, such as automobile exhaust aftertreatment systems or other pollution abatement systems, can comprise a supplemental source of heat to facilitate operation, such as faster catalyst light-off in the case of catalyst-containing systems. For example, heat can be supplied by an electric heater (e.g., arranged to transfer heat to the catalyst material) or an electrically heated catalyst substrate (e.g., an electrically conductive substrate that is carrying a catalytic material). For example, a heater can be arranged upstream of a catalyst substrate and heat the catalyst by providing heat to the flow of exhaust (or supplemental air flow), which in turn heats the catalyst. Aftertreatment systems employing supplemental heat can be provided to reduce emissions in gasoline, diesel, and/or hybrid vehicles to assist in ensuring fast and consistent light-off of the catalyst during operation of the corresponding engine, particularly after cold-start of the engine.

Referring now to FIG. 1, a fluid treatment assembly 10 is illustrated, e.g., which can be arranged as part of an exhaust system of automobile. The fluid treatment assembly 10 comprises an outer housing 12 (which may be alternatively referred to as a "can"), such as formed in a generally tubular shape (e.g., a hollow tube) from metal or suitable material. The outer housing 12 has an inlet 14, e.g., which can be connected in fluid communication with the exhaust manifold of an internal combustion engine, and an outlet 16, e.g., which can be connected in fluid communication with a tail pipe of an automobile.

Exhaust from an engine or other fluid flow (the fluid flow to be treated generally referred to herein as "exhaust") can be treated (e.g., one or more pollutants removed or abated) as the exhaust is flowed from the inlet 12 to the outlet 14 through the assembly 10. To this end, the assembly 10 further comprises a heater assembly 18 and an aftertreatment component 20 located between the inlet 12 and outlet 14. For example, the aftertreatment component 20 can be a catalyst-loaded substrate, a particulate filter, or a catalyst-loaded particulate filter. For example, catalyst substrates and particulate filters can comprise a porous ceramic honeycomb body having an array of walls that form a plurality of fluid flow paths or channels extending axially (in the direction of exhaust flow and/or perpendicular to the end faces of the body) through the body.

As described in more detail herein, the heater assembly 18 can be a resistance heater that provides supplemental heat in order to facilitate functionality of the aftertreatment component 20, e.g., by quickly initiating light-off of catalytic material disposed in or on the walls of the heater assembly 18 and/or the aftertreatment component 20. For example, the heater assembly 18 can comprise, or otherwise be connected to, electrodes 22. The electrodes 22 can be arranged extending through the housing 12 in order to connect the heater assembly 18 to a power source, such as a vehicle battery. As shown in FIG. 1, the electrodes 22 can extend radially through the housing 12. However, the electrodes 22 can alternatively extend axially through the housing 22 and/or one could extend radially while the other extends axially. In this way, the heater assembly 18 can be arranged to generate heat via Joule heating when the heater assembly 18 is connected to a power source and a corresponding voltage is applied to flow current through the walls of the heater assembly 18. The electrodes 22 are shown in FIG. 1 as being arranged on opposite sides of the heater assembly 18 (e.g., spaced 180° apart with respect to the exterior of the heater assembly 18), but can be arranged at other locations or angles.

In embodiments disclosed herein, such as shown in FIG. 1, the heater assembly 18 is positioned upstream (relatively to the direction of exhaust flow) of the aftertreatment component 20 in order to increase the temperature of the exhaust flow and/or provide direct heating to the aftertreatment component 20. This in turn increases the temperature of the aftertreatment component 20, such as the temperature of the catalytic material carried by the aftertreatment component 20, as the exhaust flows through the aftertreatment component 20. In some embodiments, the heater assembly 18 and the aftertreatment component 20 can be effectively combined into a single device by directly loading the body of the heater assembly 18 with a catalyst. Such arrangements useful for heating a catalyst material may be referred to as an electrically heated catalyst, or EHC.

A vehicle exhaust system can be created by connecting additional lengths of piping (not shown) to the assembly 10 at the inlet 14 (e.g., extending between the inlet 14 and the engine exhaust manifold) and outlet 16 (e.g., extending from the outlet 16 to the tail pipe). Depending on the design or configuration of the exhaust system, which vary vehicle to vehicle, the various components and/or lengths of piping can have different diameters at different positions along the flow path through the exhaust system.

The heater assembly 18 and the aftertreatment component 20 can be held in place, supported, and/or contained within the housing 12 in any suitable manner. For example, the body of the heater assembly 18 can be held in place and supported via one or more retainers 24, e.g., retaining rings. The aftertreatment component 18 can be supported by similar retainers and/or supported by a mat 26, such as an inorganic fiber mat, which assists in protecting the aftertreatment component, such as from vibrations or thermal expansion forces exerted on the aftertreatment component 20 during operation.

Figure 2:
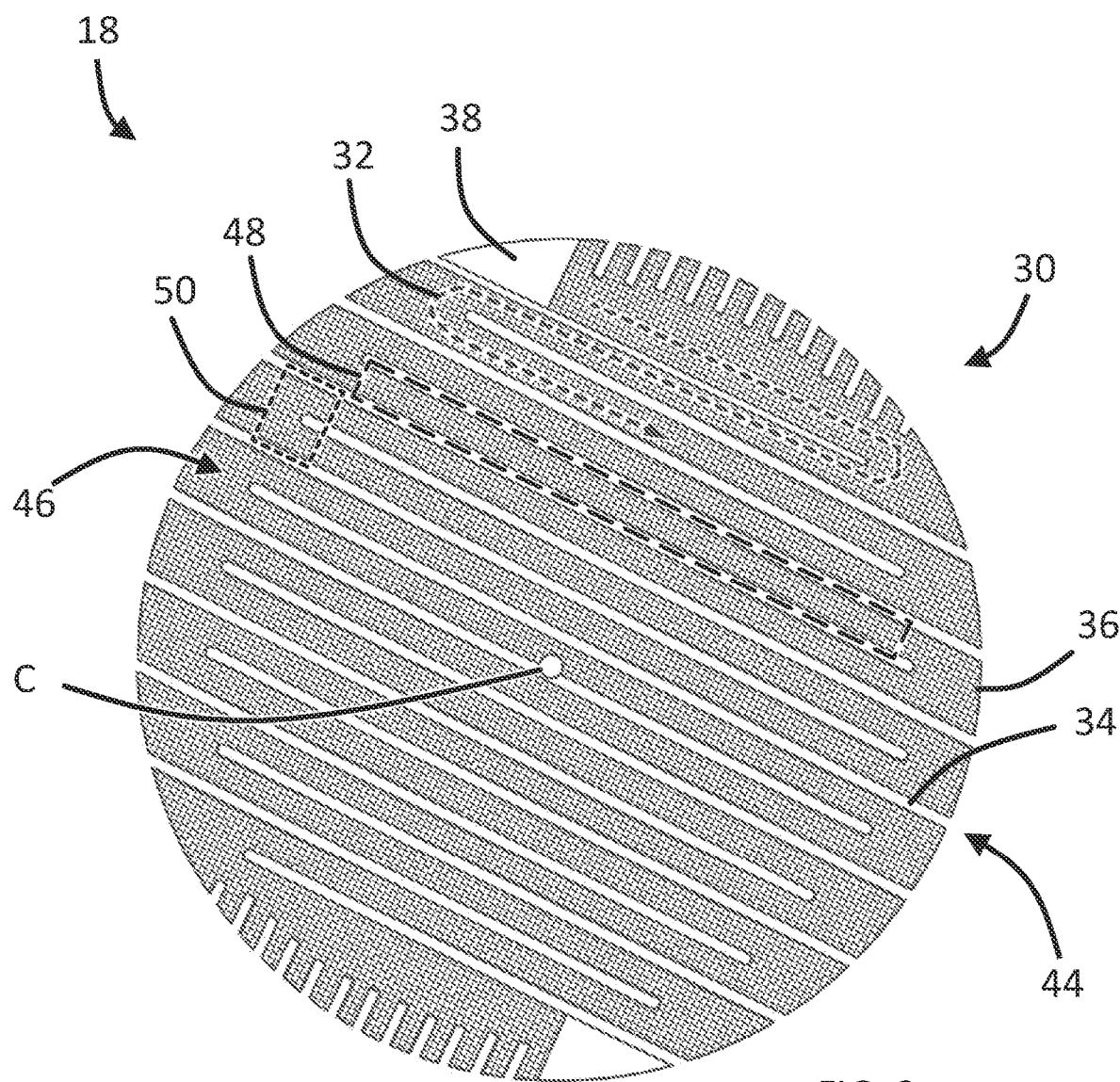
FIG. 2 is a front view of an electrical heater assembly having a serpentine design formed by a plurality of electrically insulating slots, a plurality of core segments between each pair of adjacent slots, and a bend region proximate to a terminal end of each slot and connecting adjacent core segments together, according to embodiments disclosed herein.
Figure 3:
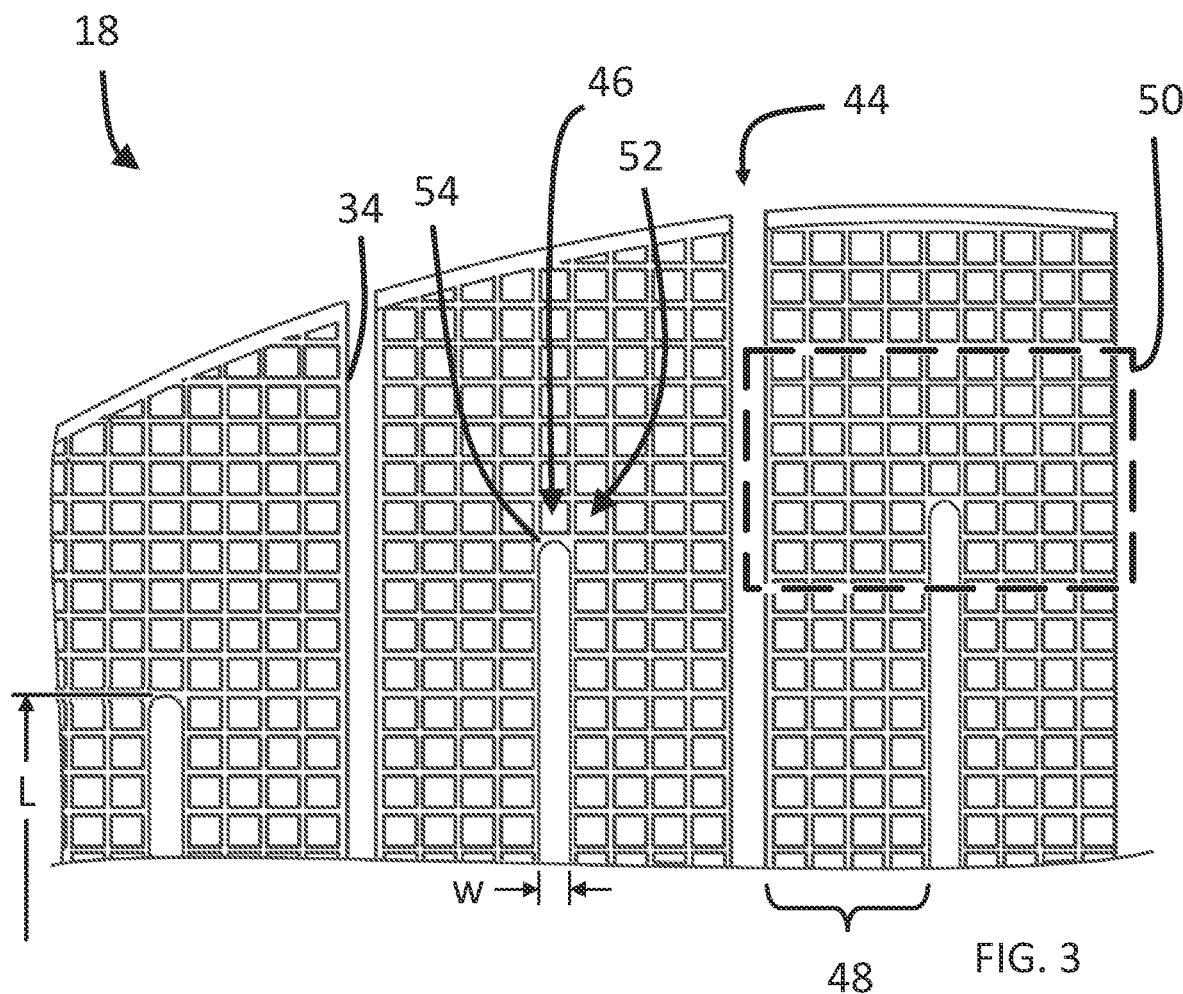
FIG. 3 shows a portion of a heater body comprising an auxiliary conductive feature in a bend region of the heater body comprising filleted or radius corners at intersections between walls according to embodiments disclosed herein.

Referring now to FIGS. 2-3, one embodiment for the heater assembly 18 is illustrated. Consistent with the disclosure herein, the embodiments illustrated and/or described herein can be used as, or incorporated in, the heater assembly 18 in the assembly 10, and combinations of the features of the embodiments illustrated or described herein can be used together for the heater assembly 18 in the assembly 10.

As described further herein, the heater assembly 18 comprises a heater body 30 comprised of electrically conductive material that extends in a serpentine current-carrying path (or simply, "serpentine path") between a pair of electrodes (e.g., the electrodes 22, not shown in FIGS. 2-3). A portion of the serpentine path for the heater body 30 is identified by a dashed lined and the reference numeral 32 in FIG. 2. As described further herein, the serpentine path 32 for the body 30 results from a plurality of slots 34 extending into the body 30 from an outer periphery 36 of the body 30.

Current flow along the serpentine path 32 of the heater body 30 can be achieved via electrodes, such as the electrodes 22 (not shown in FIG. 2) at opposite ends of the serpentine path 32. The electrodes, or portions thereof, can be integrally formed with the heater body 30, or separately attached, such as via mechanical fastening or welding, for example at corresponding electrode attachment sites 38. In this way, an electrical connection can be established along the serpentine path 32 through the body 30 via the electrodes secured at the opposite ends. For example, the properties of the honeycomb body 30, such as the dimensions of the honeycomb body 30, the length of the serpentine path 32, the area of the electrically conductive material of the heater body 30 available for current flow per unit length along the serpentine path, and/or resistivity of the material of the honeycomb body 30, can be set with respect to a targeted or selected voltage intended to be applied across the electrodes 22 in order to generate heat via resistance heating as electrical current passes through the material of the heater body 30.

In embodiments, the heater body 30 is arranged with respect to a selected voltage (e.g., a voltage available for use by the heater assembly 18 from a vehicle's battery) to reach a temperature suitable for catalyst light off, such as between about 700° ° C. and 1000° C., although other temperatures can be targeted based on the application of the heater assembly 18 and/or the thermomechanical properties of the material selected for the heater body 30. In embodiments, the material of the heater body comprises a metal or metal alloy. For example, various metal alloys are particularly advantageous for use in resistance heating elements due to their thermomechanical, environmental resistance, and electrical properties. In embodiments, the metal comprises an alloy comprising one or more of nickel, chromium, iron, and/or aluminum, such as a nickel-chromium alloy or an iron-chromium-aluminum alloy, although other materials suitable for use in or as resistance heaters can be used. However, since these materials comprise metals, these materials generally have a fairly high conductivity. Advantageously, the back-and-forth traversal of the serpentine designs described herein enables the current carrying path length for the heater body to be many times longer than the diameter of the heater body, such that the overall resistance of the heater body 30 between the electrodes can be made high enough to reach sufficient temperatures, while maintaining a compact size to the heater body.

In the illustrated embodiments, the body 30 comprises an array or matrix of intersecting walls 40 (e.g., see FIGS. 3A-3B), which form a plurality of channels (fluid flow paths) extending in an axial direction through the body 30, and thus is of the type that may be referred to as a honeycomb body. The channels provide flow paths that enable a fluid to flow through the body 30 (e.g., a flow of exhaust fluid), while the intersecting walls 40 act as resistive elements to generate heat when a voltage is applied to the body 30 and also provide surface area for heat exchange with the fluid flow. Each of the sections of the walls that are enclosed together to define a flow channel may be referred to herein as a cell 42. Accordingly, in FIGS. 2 and 3, the array of walls 40 define a corresponding array of square-shaped cells 42, which together create the honeycomb design for the body 30. However, the walls 40 can be arranged in other patterns to form the cells 42 with any other desired cross-sectional shape (the shape perpendicular to the axial direction), such as hexagonal, triangular, or other polygon.

Furthermore, in lieu of cells and channels having regular and/or repeating geometric shapes, the body 30 can comprise irregularly shaped and sized openings and/or tortuous flow paths, such as an irregular interconnected porous structure. For example, in embodiments, the body 30 comprises a lattice, a foam, or interwoven fibers, wires, or filaments (or other elongated fiber-like or wire-like elements) of conductive material in which the flow paths through the body 30 are irregularly formed by the pores, voids, openings, or interstices in the lattice structure, foam-like structure, and/or between interwoven fibers or fiber-like elements of conductive material. Thus, honeycombs, lattices, foams, and interwoven fiber or wire designs are all similar in that they have flow paths to enable a fluid to flow axially through the body, while the electrically conductive material acts as resistance heating elements that generate heat while also providing surface area for heat transfer with the flow of fluid (e.g., exhaust gas) through the heater. In embodiments, the body 30 can be formed by additive manufacturing, stamping or perforation of a sheet of conductive material, weaving of wires, fibers, or filaments into a mesh, mat, or screen, foaming of an electrically conductive material, or other suitable process. Thus, regardless of whether the heater body 30 comprises a honeycomb, lattice, foam, porous, or interwoven structure, the honeycomb body 30 comprises a multitude of flow paths axially through the body that enables heat transfer between a fluid flow and the electrically conductive material forming the flow paths.

As mentioned above, the body 30 comprises the slots 34, which create disconnections, e.g., gaps, in the heater body 30 to break electrical conductivity at certain locations in the body 30. For example, the slots 34 severe, break, disconnect, or otherwise electrically isolate portions of the body 30 from each other, thereby forcing electrical current to flow in the designated serpentine path 32 around these disconnected portions. For example, the slots 34 can be air gaps, or filled with an electrically insulating material. Each of the slots 34 comprises an open end 44 where the slot 34 intersects with the outer periphery 36 of the body 30, and a terminal end 46 at which the slot 34 terminates within the heater body 30.

As shown in FIG. 2, the slots 34 extend across the body 30 alternatingly from opposite sides of the body 30, such that the material of the body 30 (e.g., intersecting walls 40) is connected together in a serpentine pattern that doubles back on itself across the body 30 multiple times.

As further shown in FIG. 3, the slots 34 have a width W and a length L extending from the open end 44 to the terminal end 46 (only a portion of the length L is shown). If necessary, the length L of each slot 34 can be determined as the longest dimension of each slot 34 between the terminal end 46 and the open end 44, such as in the illustrated embodiment, for example, since the slot 46 intersects the outer periphery over a small range of distances because the outer periphery 36 is curved. The lengths L and/or widths W can vary for different slots 34. As a result, electrical current carried through the material of the body 30 between the electrodes 22 is forced along the serpentine path 32. The shape or design of the serpentine path is not limited to that shown in the figures, as the number of the slots 34, as well as the lengths, angles, widths, or other dimensions can be set in order to define the shape and/or dimensions of the serpentine path.

In embodiments in which the heater body 30 is formed as a honeycomb design, such as in the illustrated embodiment in which the heater body 30 comprises the intersecting array of walls 40, the width W can be equal to the combined width of one or more whole cells 42 formed by the intersecting walls 40. For example, the width W is equal to the width of one whole cell 42 in FIG. 3.

Accordingly, the electrical disconnections caused by the slots 34 enables the current path length between the electrodes 22 to be increased, as the electrical current is forced to traverse back and forth across the body 30 multiple times instead of flowing in a straight line directly between the electrodes 22. Since the overall resistance of the heater body 30 is dependent (in part) on the overall current-carrying path length between the electrodes 22, the electrical resistance of the heater assembly 18 can be set, at least in part, by selecting the dimensions, locations, and number of slots 34 (thereby setting the parameters of the serpentine current-carrying path). For example, as described herein, the serpentine design enables the heater body 30 to be formed as a relatively small, thin disc of a desirable metal alloy or other material while also generally temperatures in the hundreds of degrees Celsius.

In embodiments, with respect to the axial direction, the heater body 30 is at most 1 inch thick, at most 0.75 inches thick, at most 0.5 inches thick, such as from 0.1 inches to 1 inch, from 0.1 inches to 0.75 inches, from 0.1 inches to 0.5 inches, or from 0.25 inches to 0.5 inches. In embodiments, the diameter (or widest dimension perpendicular to the axial direction) is at most 10 inches, at most 9 inches, at most 8 inches, at most 7 inches, at most 6 inches, at most 5 inches, at most 4 inches, such as from 4 inches to 10 inches, although the size of the heater body can be arranged based on the particular application, such as to correspond generally to the cross-sectional size of the catalyst substrate or filter with which the heater is used.

Since the slots 34 provide electrical isolation, the terminal ends 46 of the slots 34 correspond to the locations where the serpentine path 32 bends around the slots 34, and thus represent the locations at which the current flow changes direction. It has been found that these bends in the serpentine path can result in more heat generation, and therefore high temperature "hot spots" to be formed due to concentration of current flow at the terminal ends 46. That is, current flow will tend to concentrate along the shortest path through the bends, which corresponds to the material of the heater body 30 that directly abuts and/or bounds against the terminal ends 46 of the slots 34. Such hot spots may cause these areas of the heater body 30 to be particularly prone to premature failure, breakage, cracking, bending, warping, or other degradation in mechanical or thermomechanical properties or performance, especially as the heater assembly 18 undergoes increasing numbers of heating and cooling cycles during use.

Furthermore, due in part to the concentration of current flow through the material of the heater body 30 directly against to the terminal ends 46, the material of the heater body 30 beyond the terminal ends 46 (in the direction that the slots 34 extend into the heater body 30) will be rapidly cooler than both the hot spots and the rest of the heater body 30. This rapid cooling results because there is increasingly less current flow in the material of the heater body 30 as the distance toward the outer periphery 36 from the terminal end 46 increases.

In consideration of the above, and as shown in FIGS. 2-3, the serpentine path 32 can be defined along a plurality of core segments 48 and a plurality of bend regions 50 of the heater body 30. More particularly, each of the core segments 48 is defined as the electrically conductive material of the heater body 30 that extends between and along each pair of adjacent ones of the slots 34, while the bend regions 50 comprise the electrically conductive material of the heater body 30 in the areas proximate to the terminal ends 46 where the serpentine path 32 bends.

Examples of the general areas corresponding to the core segments 48 and the bend regions 50 are identified in the figures. However, since the core segments 48 and the bend regions 50 are each formed from the electrically conductive material of the heater body 30 (e.g., the core segments 48 and the bend regions 50 can be integrally formed from electrically conductive material as part of the same structure, such as both being formed from, or as part of, the array of intersecting walls 40 shown in the figures), there may not be a physically clear delineation or demarcation between these two areas. Instead, the core segments 48 and the bend regions 50 can overlap to some degree and/or there can be a transition between them.

While it may be difficult to physically see a transition between the core segments 48 and the bend regions 50, the temperature profile of the heater body 30 can be useful to ascertain with more specificity where the core segments 48 and the bend regions 50 are located. For example, when a suitable voltage is applied across the heater body 30 to raise the temperature of the heater body to at least several hundred degrees (e.g., in the range of 700° C. to 1000° C.), the material of the heater body 30 in the core segment 48 will reach a substantially consistent or uniform temperature throughout the core segment 48, while the temperature in the bend region 48 will vary significantly from that of the core segment 48. For example, as described above, the bends in the serpentine path 32, located within the bend region 50 of the heater body 30, will tend to undesirably promote formation of both the aforementioned hot spots and of the rapidly cooler areas in the heater body 30 beyond the terminal ends 46 and toward the outer periphery 36 in the direction that each slot extends into the heater body 30.

As also shown throughout FIGS. 3-11, the heater body 32 comprises an auxiliary conductive feature 52 located in at least some of the bend regions 50. As described further herein, the auxiliary conductive features 52 comprise additional or excess electrically conductive material arranged in various patterns, regions, structures, and/or areas of the heater body 30. As described further herein, it has been found that the inclusion of the auxiliary conductive features 52 in the bend regions 50, where the serpentine path 32 bends around the terminal ends 46 of the slots 34, can be advantageously useful to locally reduce the resistance of the heater body 30 in the bend regions 50. In this way, the reduction of resistance of the heater body 30 locally within the bend region 50 assists in causing the electrical current to distribute to a greater degree throughout a larger area in the bend regions 50. By distributing the current flow through a larger area (through more electrically conductive material), the auxiliary conductive features 52 assist in alleviating the creation of hot spots in the material directly abutting or bounding the terminal ends 46 of the slots 34 and in mitigating the rapidly cooler temperatures in the heater body 30 toward the outer periphery as the distance from the terminal ends 46 increases.

The auxiliary conductive features 52 can be the same or different material as the electrically conductive material that forms the base structure of the heater body 30. For example, the material of the auxiliary conductive features 52 can be the same or different than that of the walls 40 if a honeycomb design is utilized for the heater body 30, or the same or different than that of a foamed body, lattice, or interwoven fibers or wires from the embodiments described herein.

In the embodiment of FIG. 3, the auxiliary conductive feature 52 comprises filleted or radiused corners 54 of the walls 40 that directly abut the terminal ends 46 of the slots 34, such that the terminal ends 46 are correspondingly rounded or tapered. In embodiments in which the heater body 30 comprises a honeycomb design, the terminal ends 46 need not be tapered or pointed, but can have a shape that is different than that of the regular pattern of the intersecting walls 40 or otherwise occupy only a fraction of one of the cells 42 (e.g., the terminal end 46 can terminate half-way through one of the cells 42 and the auxiliary conductive feature 52 can comprise the other half filled with an electrically conductive material).

Figure 4:
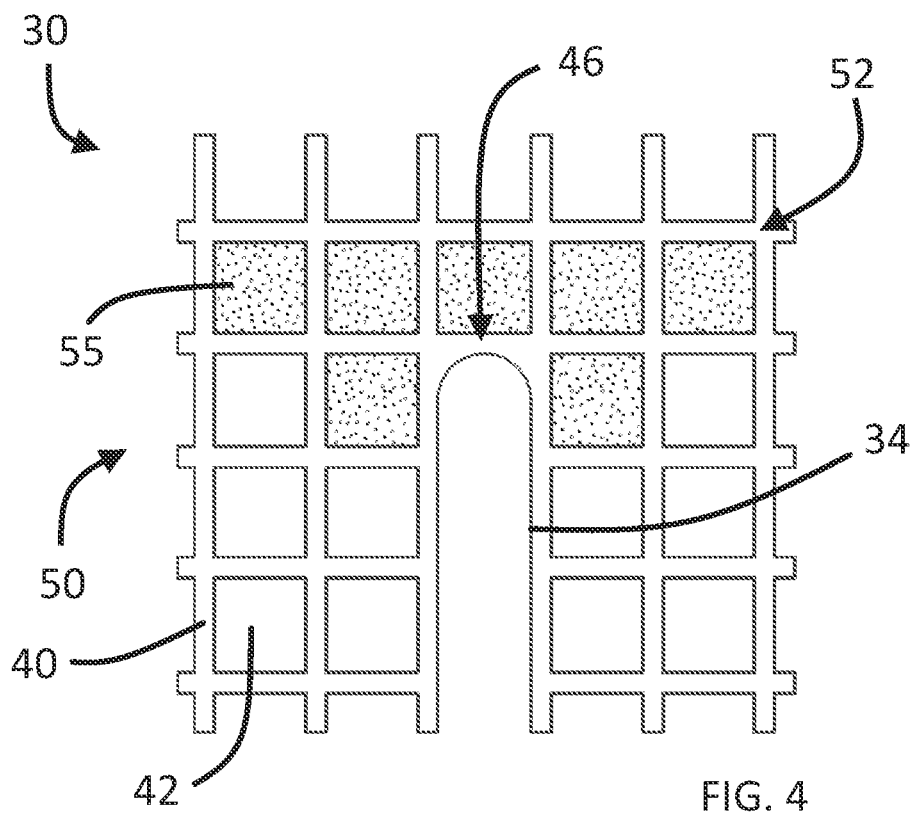
FIG. 4 shows a portion of a heater body comprising an auxiliary conductive feature in a bend region of the heater body comprising a plurality of honeycomb cells completely filled with conductive material according to embodiments disclosed herein.
Figure 5:
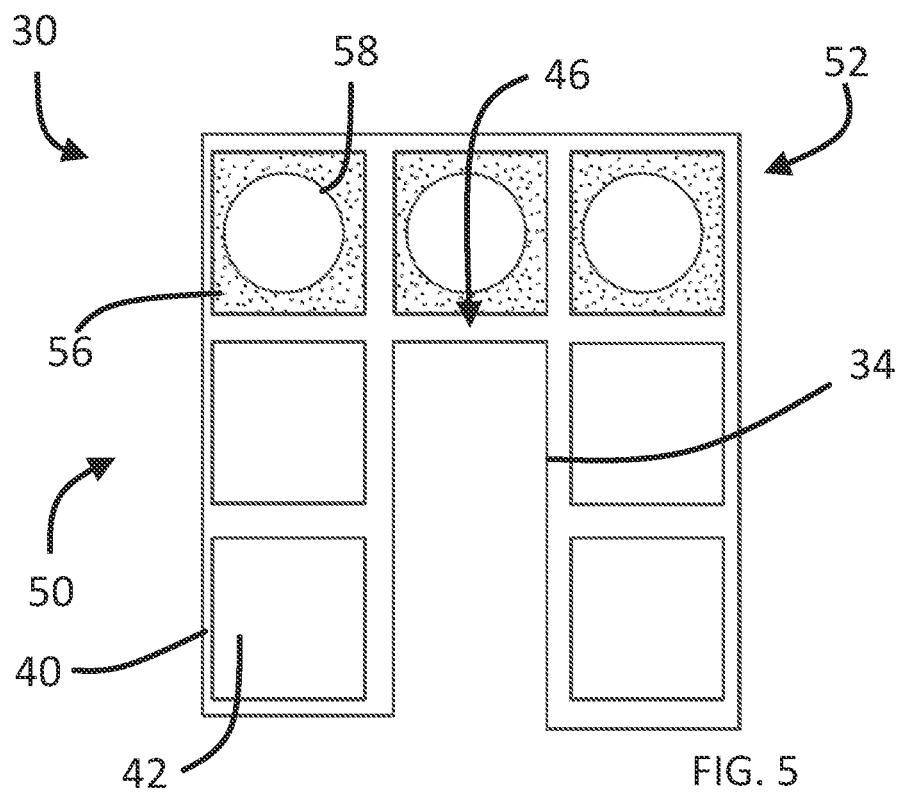
FIG. 5 shows a portion of a heater body comprising an auxiliary conductive feature in a bend region of the heater body comprising a plurality of honeycomb cells partially filled with conductive material according to embodiments disclosed herein.

FIG. 4 illustrates an embodiment in which the heater body 30 has a honeycomb design and the auxiliary conductive feature 52 comprises several of the cells 42 directly proximate to the terminated ends 40 are completely filled with electrically conductive material, designated with reference numeral 55. FIG. 5 illustrates an embodiment in which the auxiliary conductive feature 52 comprises several of the cells 42 proximate to the terminal end 46 that have been partially filled, designated with reference numeral 56. Accordingly, the partially-filled cells 56 comprise a flow passage 58 therein, e.g., to assist in further heat transfer with the fluid flow through the heater. Completely filled channels, e.g., as shown in FIG. 4, can be used together in combination with the partially-filled cells 56 as shown and described in FIG. 5. Any number (e.g., greater than or fewer than the illustrated number of completely-filled cells 55 and/or partially-filled cells 56) or combination of cells (e.g., different than the patterns shown) can also be used.

Figure 6A:
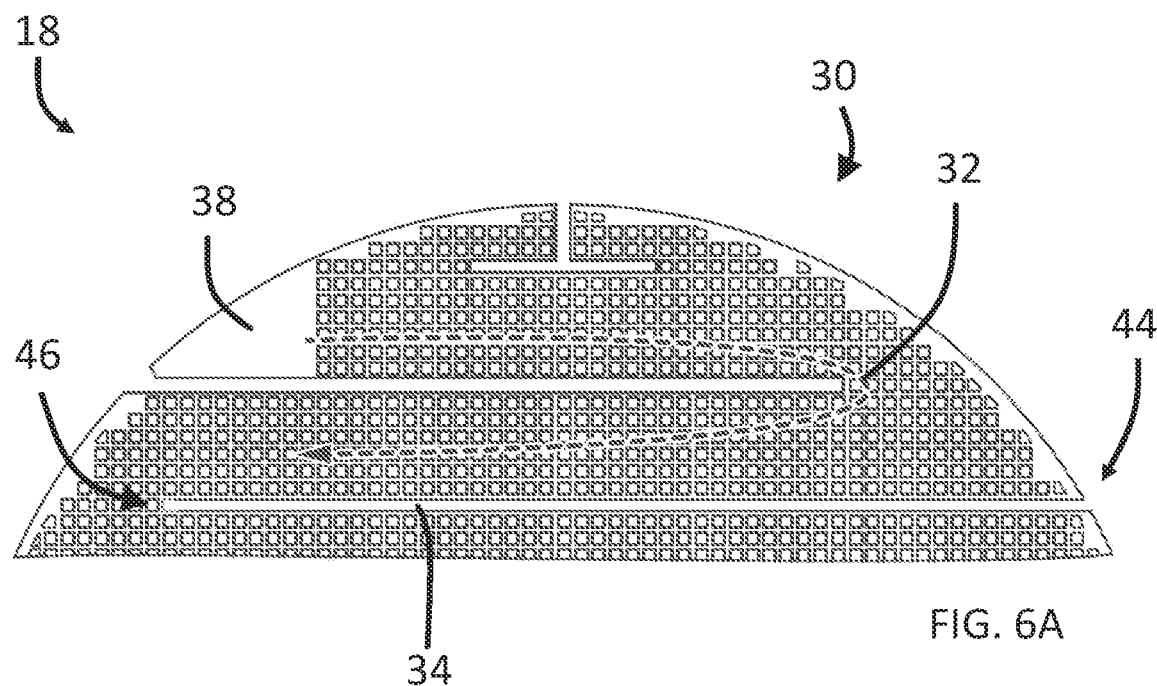
FIGS. 6A and 6B schematically show a representative current path for a heater body both without and with an auxiliary conductive feature according to embodiments disclosed herein.
Figure 6B:
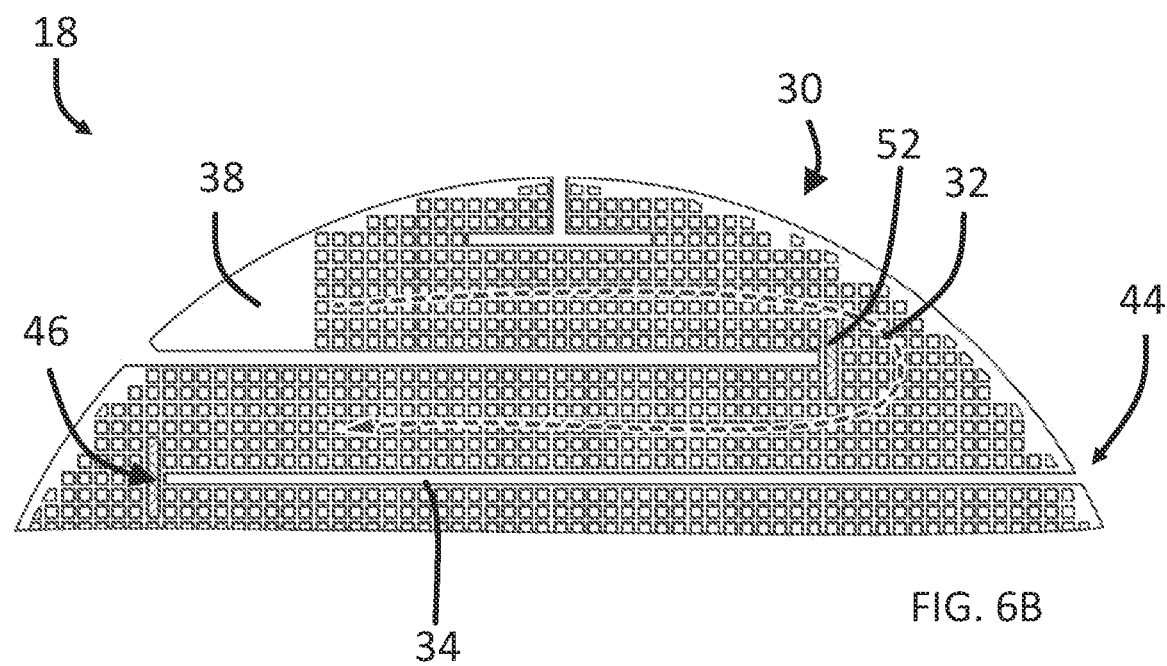

A general schematic comparison between the heater body 30 without and with the auxiliary conductive features 52 proximate to the terminal ends 44 of the slots 34 in the bend region 50 can be appreciated in view of FIGS. 6A and 6B. More particularly, the approximate path for the center of electrical current flow, thereby generally representing the serpentine path 32, is shown schematically in FIGS. 6A-6B as a dashed line. As shown in FIG. 6A, which lacks the auxiliary conductive features 52, and consistent with the description herein, the electrical current flow tends to concentrate at the terminal end 46, as shown by the dashed line in FIG. 6A "pinching" closely to the terminal end 46. This concentration of current flow can result in the aforementioned hot spots at the terminal ends 46. In contrast, the addition of the auxiliary conductive features 52 in FIG. 6B (the feature 52 in FIG. 6B resembling a strip of five of the fully-filled cells 55 of the embodiment of FIG. 4) results in the electrical current spreading out, and thereby taking a "wider" bend around the terminal end 46 in FIG. 6B. In this way, the auxiliary conductive features 52 located at the terminal ends 46 can be useful in embodiments to reduce hot spots at terminal ends 46 of the slots 34 where the serpentine path 32 bends to double back on itself.

Figure 7A:
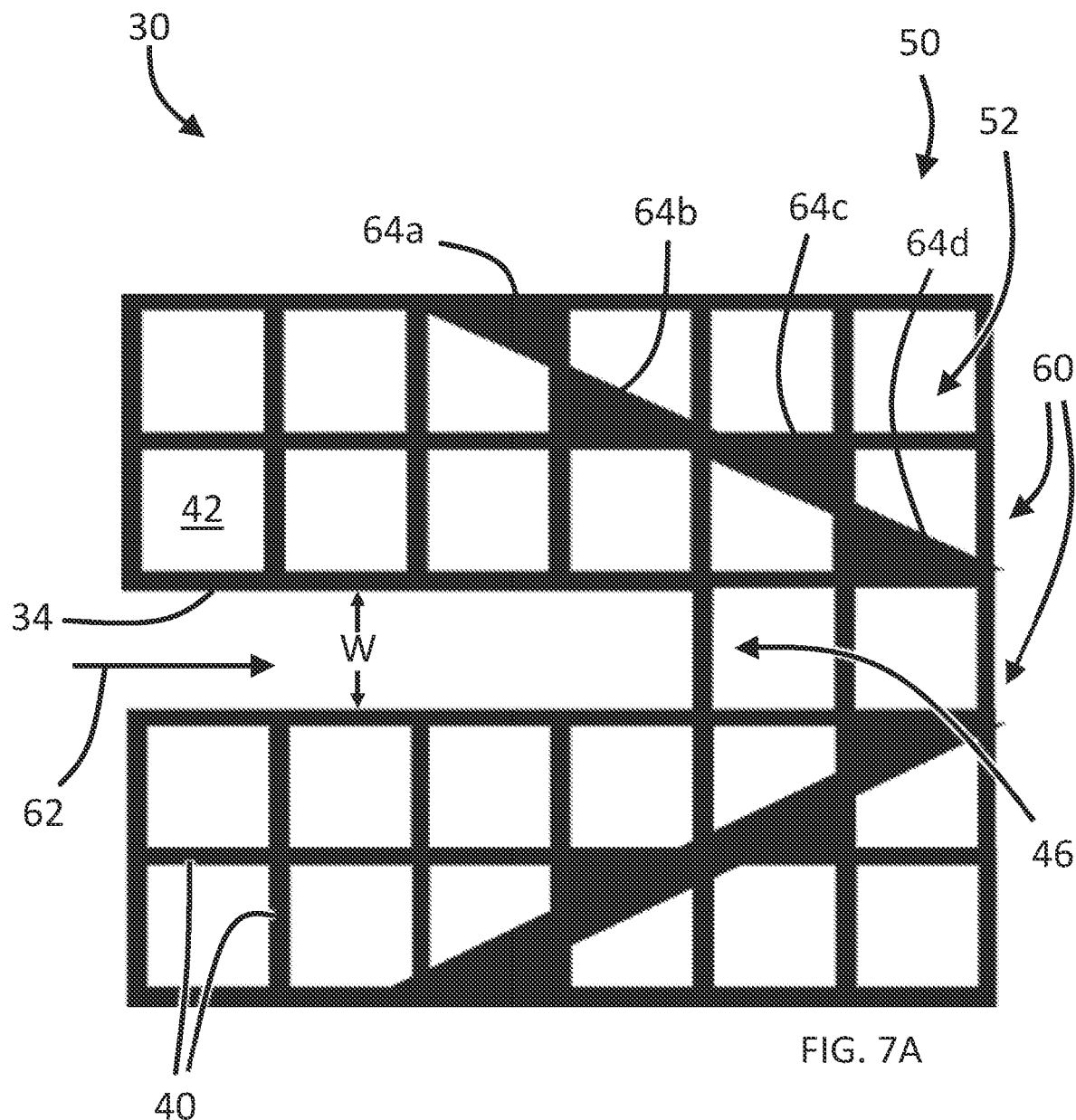
FIG. 7A shows a portion of a heater body comprising an auxiliary conductive feature in a bend region of the heater body comprising a strip of conductive material according to embodiments disclosed herein.

It has been found that extending the auxiliary conductive features 52 not only beyond the terminal ends 46 of the slots 24, but also at least partially along the length L (see FIG. 3) of the slots can be particularly beneficial in embodiments to further assist in "guiding" the electrical current away from the terminal ends 46. For example, FIG. 7A illustrates one such embodiment in which the auxiliary conductive features 52 take the form of a plurality of strips 60, which extend both partially along the length L of the slots 34 and also past the terminal ends 46 in the direction that the slots 34 extend into the heater body 30, which is indicated in FIG. 7A by arrow 62. More specifically, the strips 60 each comprise a plurality of wedges 64 that partially fill corresponding ones of the cells 42, and which are designated with alphabetic suffixes 'a'-'d' for ease of description.

It can be determined if the auxiliary conductive features 52 are located at least partially along the length L of the slots 34 if at least portions of the auxiliary conductive features 52 are intersected by hypothetical lines extending from the sides of the slots 34 perpendicularly with respect to the direction 62 of the slots 34. Thus, in the case of the strips 60, both wedges 64a and 64b are located along the length L of the slot 34, while wedges 64c and 64d are located past the terminal end 46 with respect to the direction 62.

It has also been found that it can be even more advantageous to assist in "guiding" the electrical current away from the terminal ends 46 by having at least a portion of the auxiliary conductive feature 52 spaced away from the slot 34 in locations where the auxiliary conductive feature 52 is also extending along the length of the slots 34. For example, as noted above, both the wedges 64a and 64b are positioned at locations along the length L of the slot 34. Additionally, both of the wedges 64a and 64b are spaced away from the slot 34. In particular, the wedge 34 is spaced away from the slot 34 by a full width of one of the cells 42, while the wedge 64a is spaced about one and a half cell widths. In this way, the auxiliary conductive feature 52 in the form of the strips 60 acts to "collect" a higher density of the current from the corresponding core segment 48 and to "guide" this higher density of current around and away from the terminal end 46. The auxiliary conductive feature 52, e.g., the strip 60, can extend from the bend region 50 into the adjoining core segment 48, if desired.

Figure 7B:
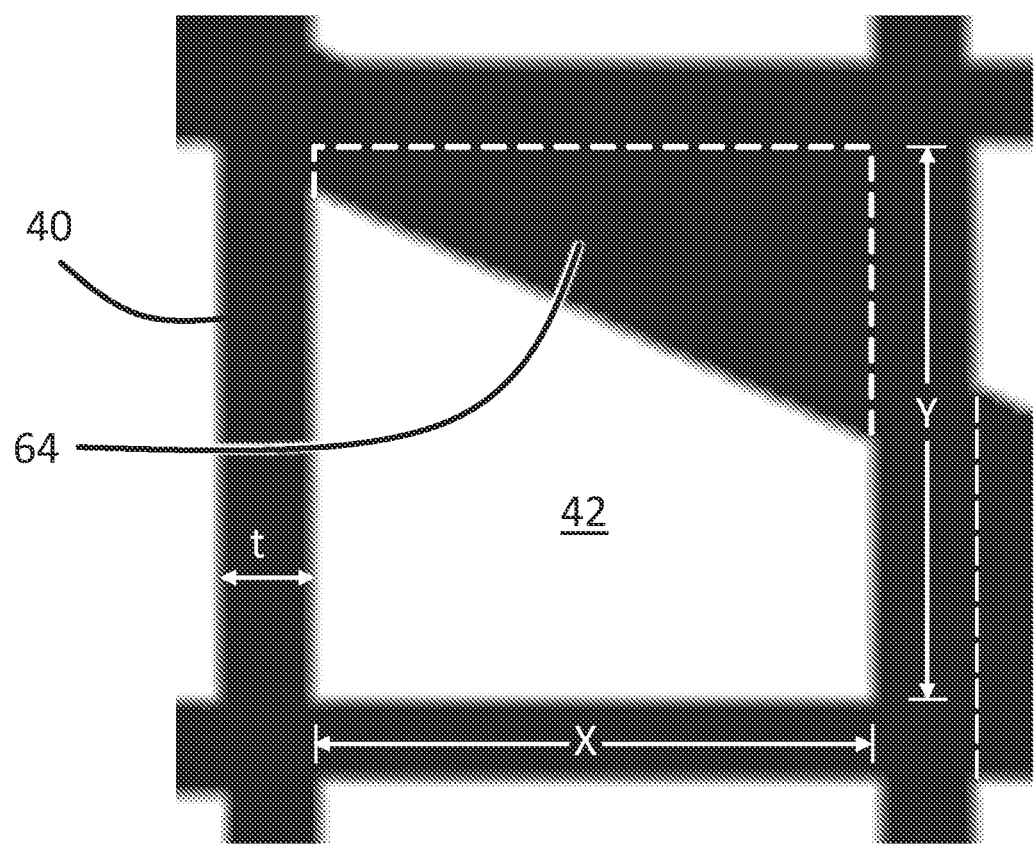
FIG. 7B shows an enlarged view of a portion of the strip of FIG. 7A in the form of a wedge partially filling a honeycomb cell.

FIG. 7B shows an enlarged view of a single one of the cells 42 partially filled by one of the wedges 64 of FIG. 7A. Dashed white lines are included for ease of differentiation between the wedge 64 and the walls 40 (having wall thickness t), although it is noted that the wedges 64 can be formed integrally with the walls 40. Effectively, the wedges 64 can be arranged as filled-in or exaggeratedly filleted corners between intersecting walls 40. As shown in FIG. 7B, the wedges 64 can extend at least partially along one or both relevant cross-sectional dimensions of the cell 42 partially filled by the wedge. The dimensions of the cell 42 are designed in FIG. 7B as X and Y. In FIG. 7B, the cell 42 is a square, so X and Y are the same, but in other embodiments, the dimensions could differ. In the illustrated embodiment, the wedge 64 extends the entirety of the first dimension X (in the direction 62 of the slots 34), but only partially along the second dimension Y (in the direction perpendicular to the direction 62). In embodiments, the wedge 64 extends only partially along both dimensions X and Y. For example, in some embodiments, the wedge 64 does not extend the full cell distance X but instead starts spans from 25% to 75% of the dimension X. The wedge 64 is also shown as increasing from a minimum width at one side (the left-hand side of FIG. 7B) and a maximum width at the opposite side (the right-hand side of FIG. 7B). In embodiments, the minimum width ranges from 0% to about 50% of second dimension Y, such as from 0% to 25%, or even from 0% to 10%, while the maximum width ranges from about 20% to about 100% of second dimension Y, such as from 20% to 80%, from about 30% to about 70%, or from about 40% to about 60%.

Figure 8:
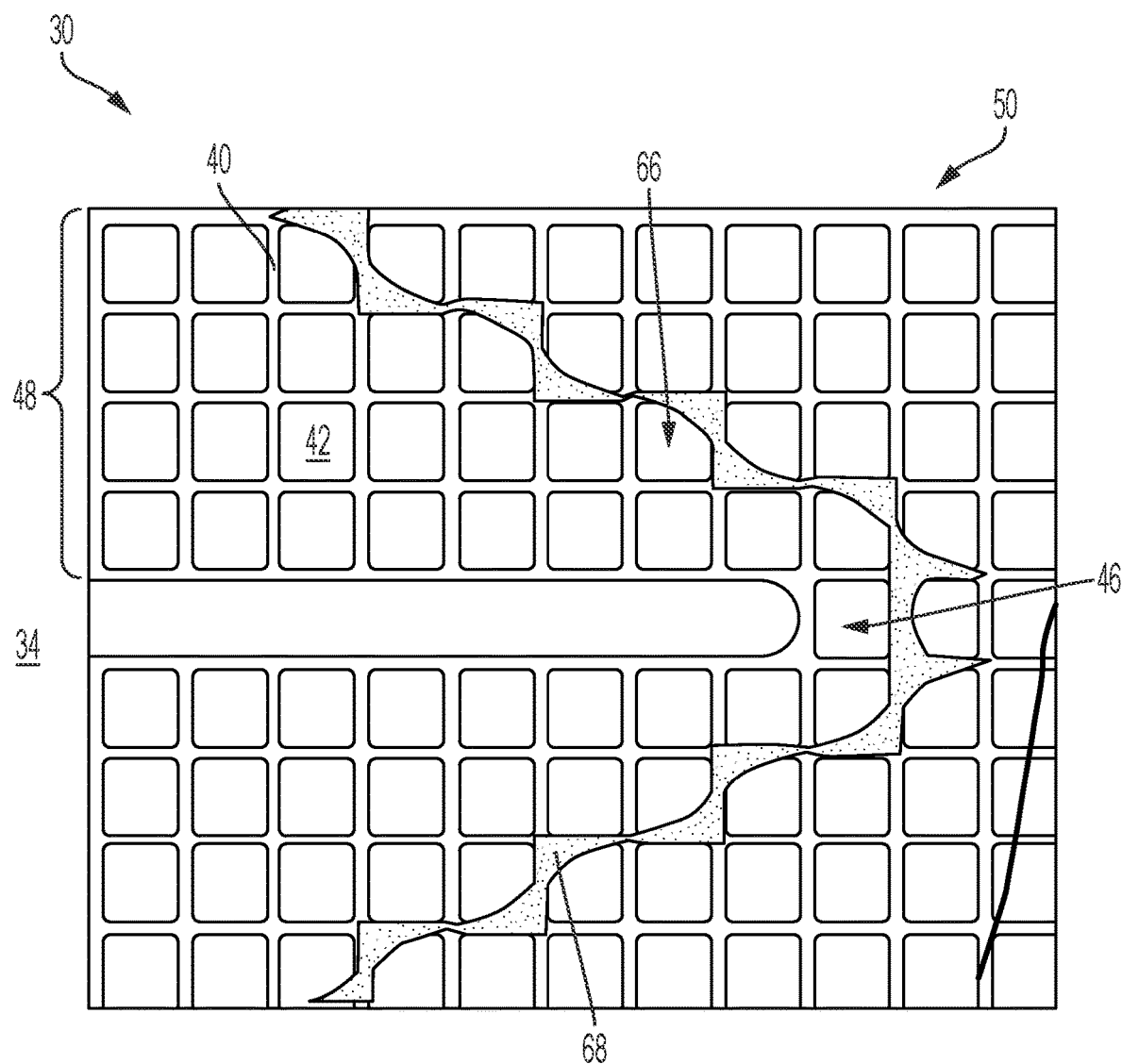
FIG. 8 shows a portion of a heater body comprising an auxiliary conductive feature in a bend region of the heater body comprising a strip of conductive material that comprises a plurality of scalloped wedges according to embodiments disclosed herein.

FIG. 8 illustrates an embodiment for the auxiliary conductive feature 52 generally similar to that of FIGS. 7A-7B, but with two main differences. First, the auxiliary conductive feature 52 in FIG. 8 comprises a single, continuous strip 66 that extends at least partially along the slot 34 on both sides of the slot 34 and also completely around the terminal end 46. In comparison, FIG. 7A shows two strips 60 that are separated by one of the cells 42 beyond the terminal end having any additional material in it. However, it is noted that each of the two strips 60 is itself considered continuous as each successive wedge 64 in the strip commonly abuts the same wall 40 as the previous wedge 64. Secondly, the auxiliary conductive feature 52 in FIG. 8 comprises curved or scalloped wedges 68, unlike the linear-slopes of the wedges 64. The wedges 68 can extend over the same percentage ranges of the dimensions X and Y of the cells 42 as described with respect to the wedges 64, except following a non-linear curve instead of the linear slope of the wedges 64.

The curved or scalloped wedges 68 can be particularly advantageous in some embodiments to achieve similar temperature reduction as the linear wedges 64, but with significantly less material used. The use of less material in the wedges 68 can provide for a greater open area for fluid (e.g., exhaust) to flow through the heater body 30 and may also assist in reducing strain on the heater body 30 due to thermal expansion differences or other temperature-based dimensional changes.

FIGS. 9A-9F illustrate various embodiments in which the heater body 30 has a honeycomb design and the auxiliary conductive feature 52 comprises various strips of thickened walls 70 (corresponding designated with alphabetic suffixes 'a'-'f'), which are wider in wall thickness than the walls 40 throughout the heater body 30. Similar to the embodiments of FIGS. 7A-8, the auxiliary conductive features 52 in the embodiments of FIGS. 9A-9F comprise portions that extend at least partially along the length L of the slot 34. In particular, each of the embodiments 9A-9F comprises a continuous strip of thickened walls 70 that extends at least partially along the length L not only on both sides of the slots 34, but also continuously around the terminal ends 46. In embodiments, some or even all of the corners between intersecting thickened walls 70 can be at least partially filled in with a fillet or wedge as described with respect to the wedges 64 and 68. In some embodiments, the thickened walls 70 are at least 25% wider than the intersecting walls 40, at least 50% wider than the intersecting walls 40, at least 75% wider than the intersecting walls 40, or even at least twice as thick as the intersecting walls 40.

Figure 9A:
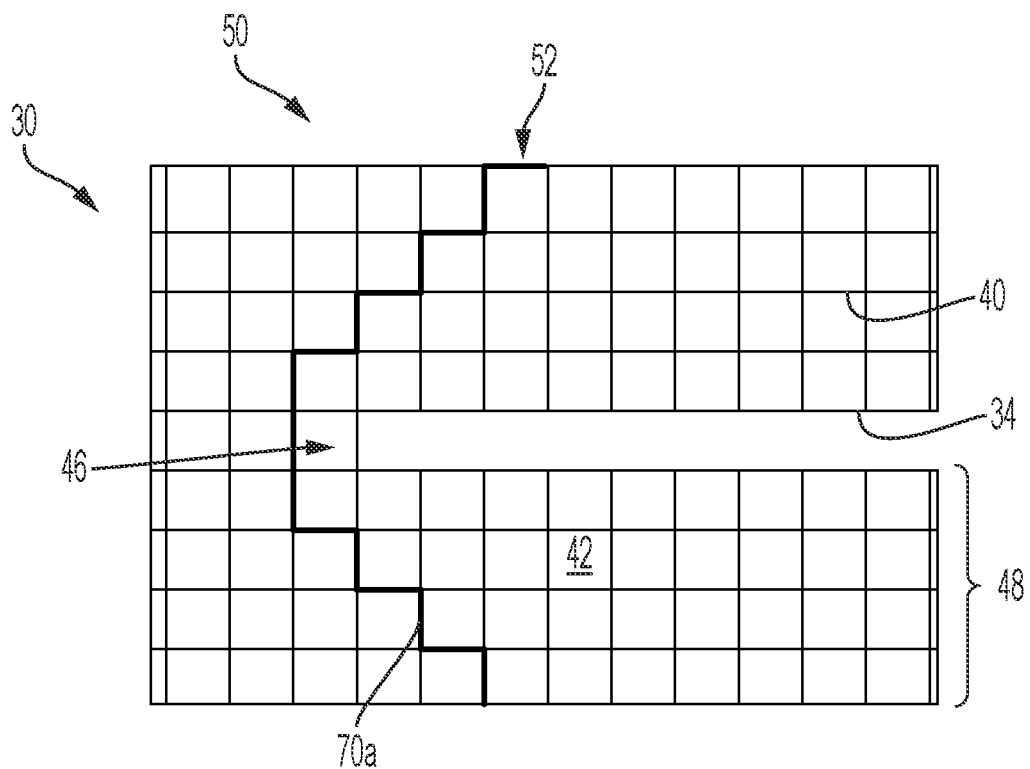
FIGS. 9A-9F show respective portions of heater bodies comprising auxiliary conductive features in a bend region of the heater body, each auxiliary conductive feature comprising a strip of thickened walls according to embodiments disclosed herein.
Figure 9B:
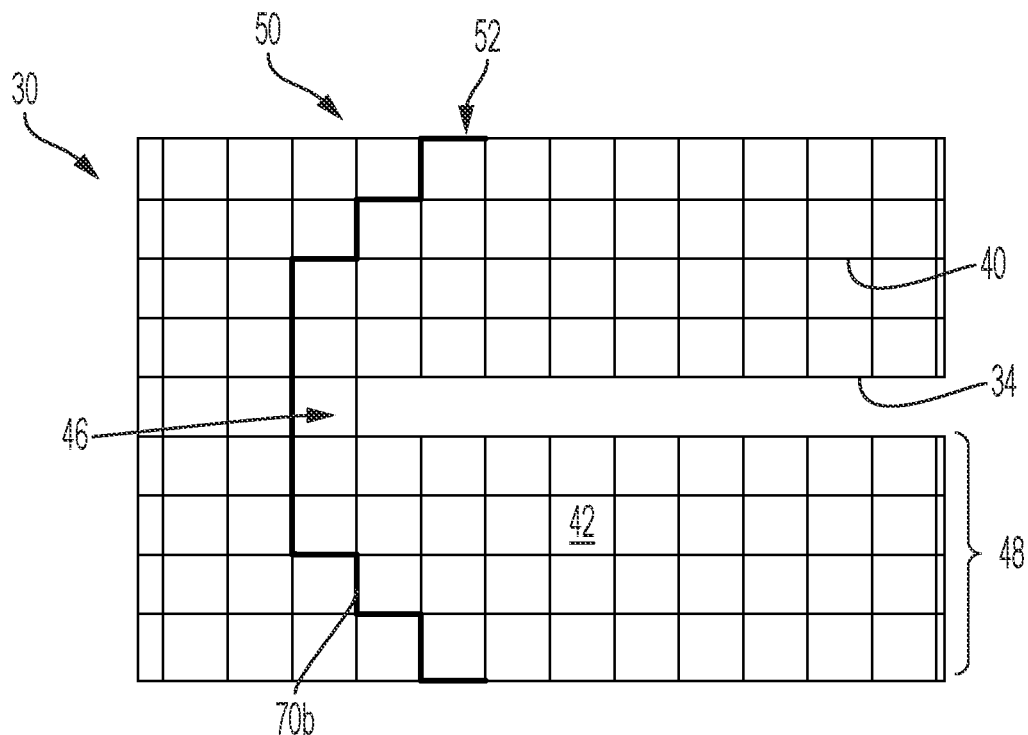
Figure 9C:
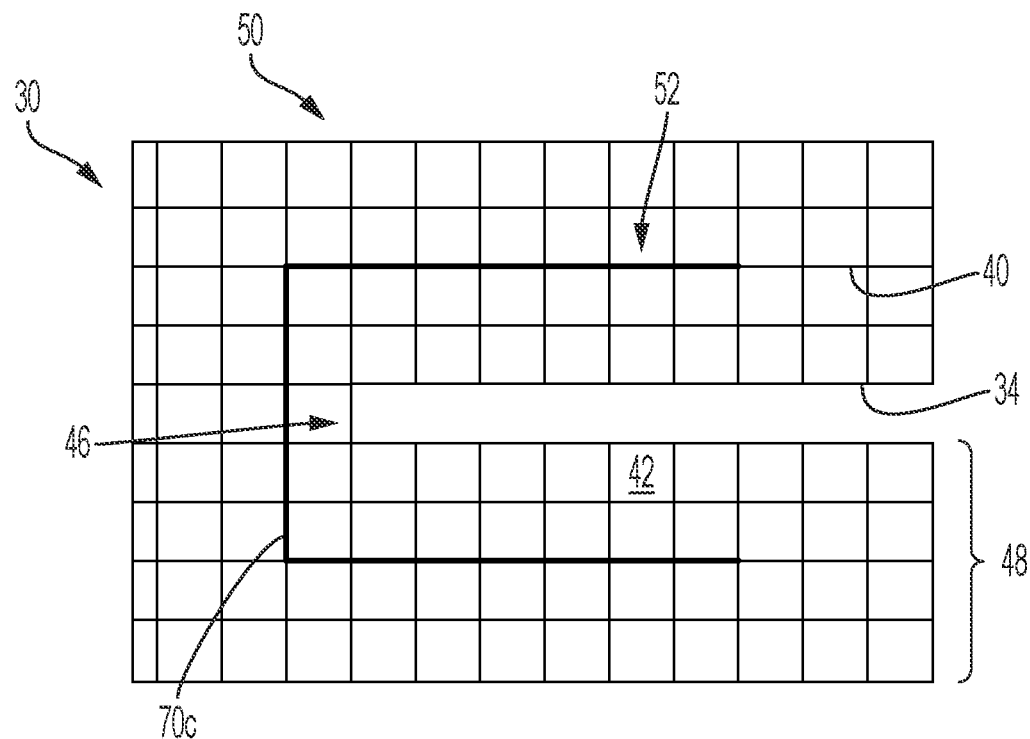
Figure 9D:
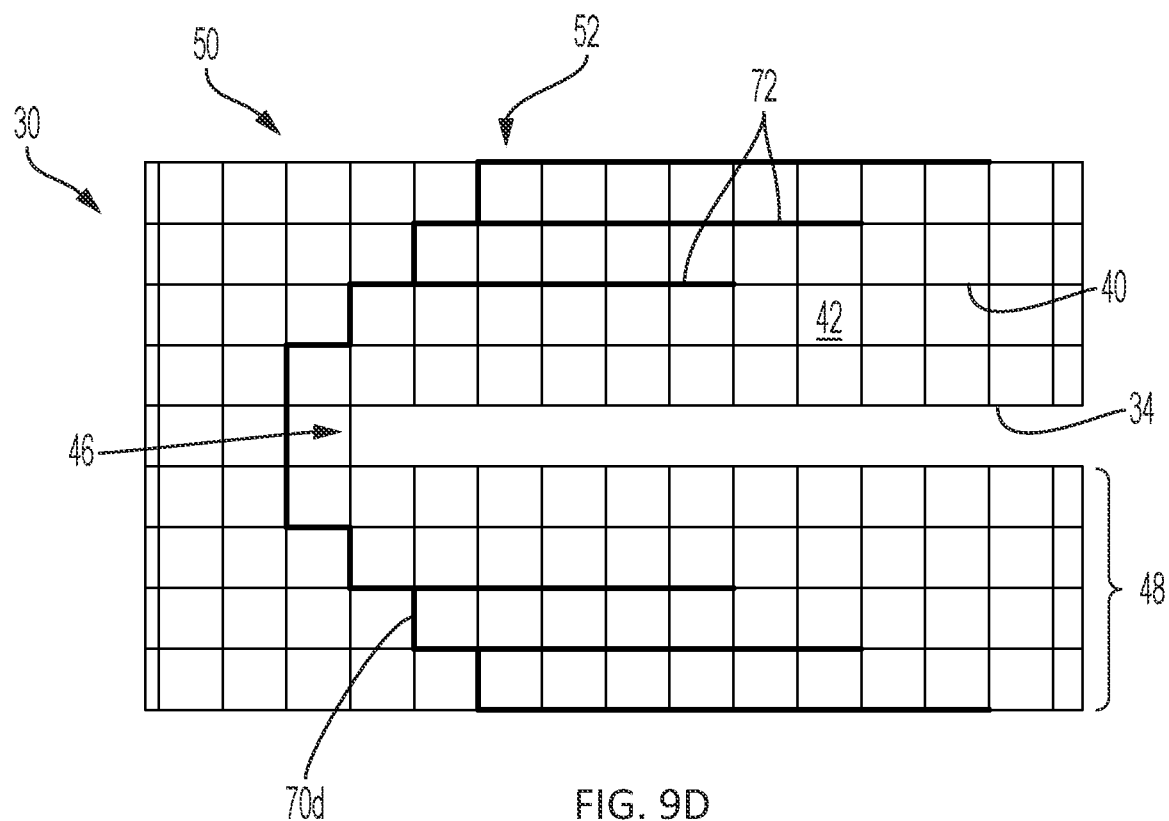
Figure 9E:
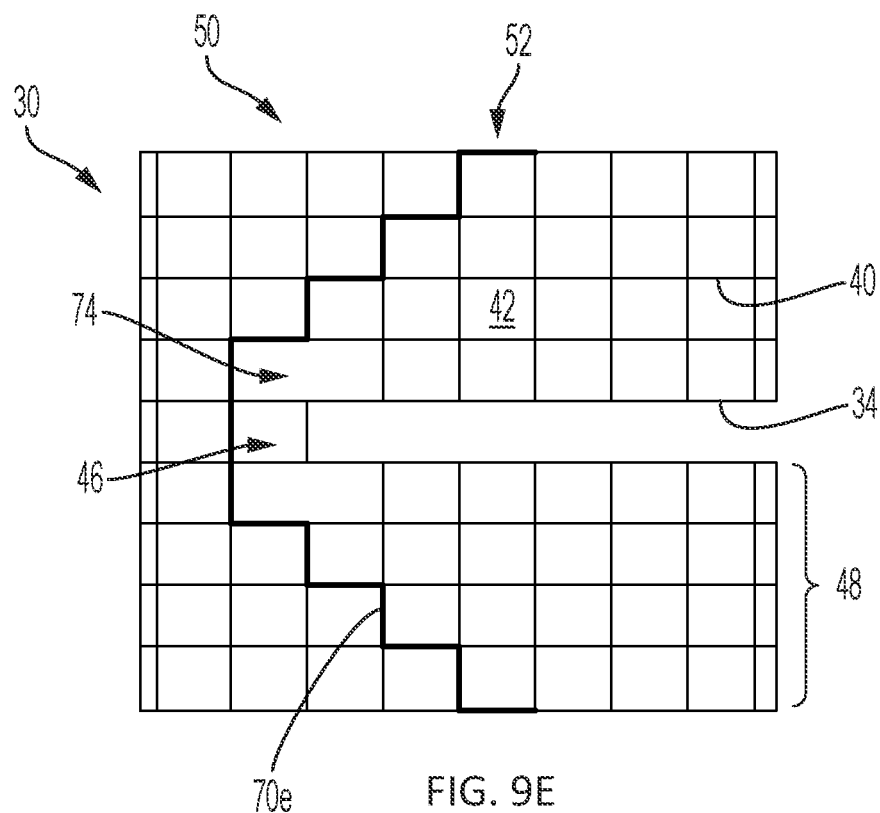
Figure 9F:
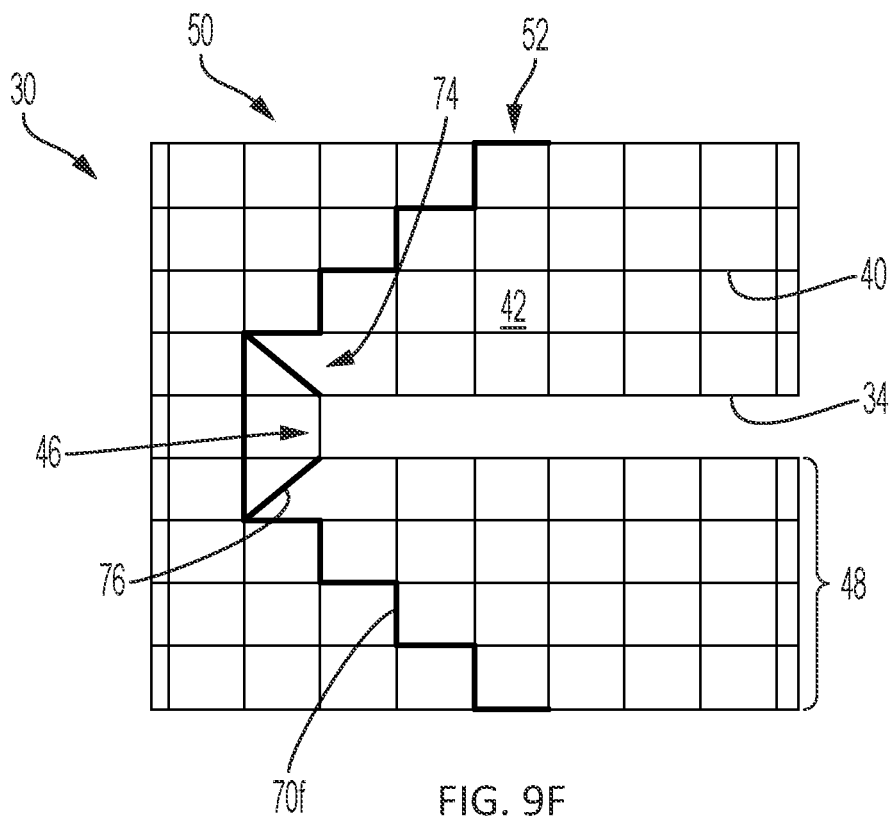

More specifically, FIGS. 9A-9C each depict different patterns for the strips of thickened walls 70, designated respectively as thickened walls 70a, 70b, and 70c. As shown, the thickened walls 70a and 70b in FIGS. 9A and 9B can be useful to space the auxiliary conductive feature 52 in locations along the length L of the slots 34 further away from the slots 34 (as generally described with respect to the embodiment of FIG. 7A above) than that of the thickened walls 70c in FIG. 9C, which are relatively closer to the sides of the slot 34. That is, the thickened walls 70c in FIG. 9C are spaced approximately two cell widths away from the sides of the slot 34, while the walls 70a and 70b of FIGS. 9A and 9B increase the distance away from the sides of the slots 34 in a stepwise manner up to a distance of four cell widths. The thickened walls 70d in FIG. 9D generally resemble the thickened walls 70a in FIG. 9A, except that the walls 70d additionally comprise a plurality of arms 72 extending at least partially along the length of the slot 34. The thickened walls 70e in FIG. 9E also generally resembles that of the thickened walls 70a, except the heater body 30 in FIG. 9E differs in that portions of the walls 40 have been removed on both sides of the terminal end 46 to create gaps 74. The gaps 74 can be particularly helpful to prevent current flow in the material of the heater body 30 directly abutting the terminal end 46. However, the removal of wall portions may reduce the strength of the heater body 30 in FIG. 9E. Accordingly, FIG. 9F shows a design similar to that of FIG. 9E except that there are additionally two diagonal walls 76 extending diagonally from the thickened walls 70f to the terminal end 46, which advantageously provide supplemental strength or support to the heater body 30 to counteract that lost by creation of the gaps 74.

Figure 10:
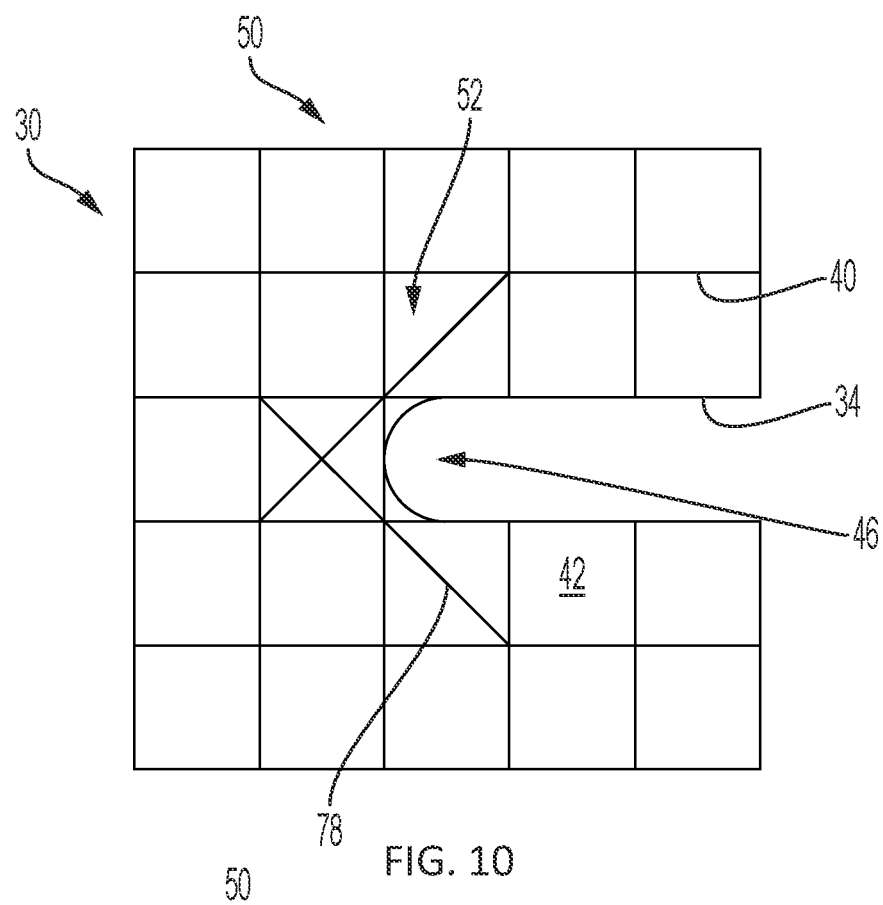
FIG. 10 shows a portion of a heater body comprising an auxiliary conductive feature in a bend region of the heater body comprising supplemental walls extending transversely across honeycomb cells according to embodiments disclosed herein.

FIG. 10 illustrates an embodiment in which the auxiliary conductive feature 52 comprises supplemental walls 78 extending transversely across some of the cells 42. The supplemental walls 78 are arranged similarly with respect to multiple other embodiments herein in that they extend at least partially along the length L of the slot 34 on both opposite sides of the slot and completely around the terminal end 46 in a continuous strip or path. Additionally, the portions of the supplemental walls 78 that are extending at least partially along the length L of the slot 34 are also spaced away from the slot 34.

Figure 11:
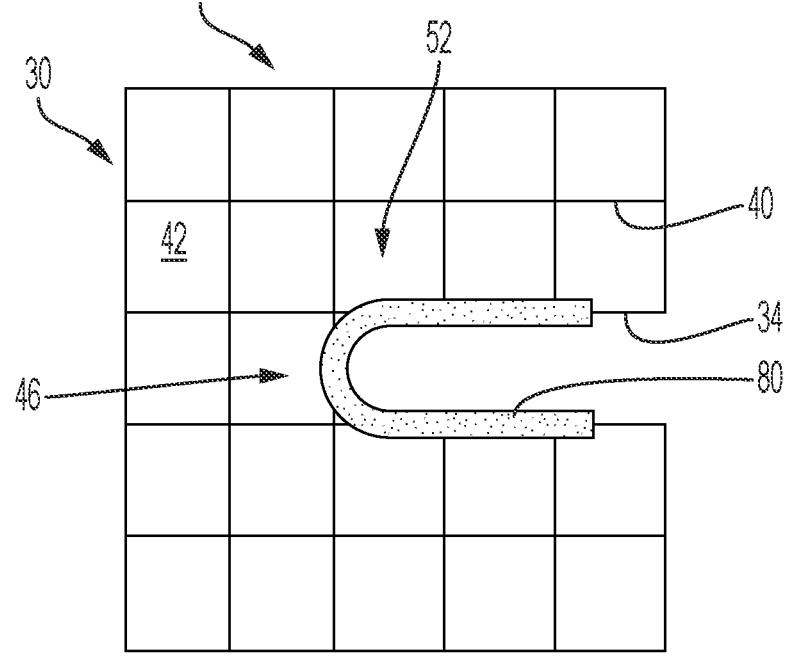
FIG. 11 shows a portion of a heater body comprising an auxiliary conductive feature in a bend region of the heater body comprising a thickened border wall around the terminal end of the slot according to embodiments disclosed herein.

FIG. 11 illustrates an embodiment in which the auxiliary conductive feature 52 comprises a thickened border wall 80 about the terminal end 46 and extending at least partially along the length of the slot 34. Accordingly, the thickened border wall 80 generally resembles the filleted corners 54 of FIG. 3, but extended in a thickened portion also down a portion of the sides of the slots 54. For example, the thickened border wall 80 can be at least 50% thicker than the walls 40, at least twice as thick as the intersecting walls 40, or even at least three times as thick as the intersecting walls 40.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A heater body comprising:
    an outer periphery;
    a plurality of slots, each slot extending from the outer periphery and terminating at a terminal end within the heater body,
    a plurality of core segments comprised of an electrically conductive material, each core segment defined between a different pair of adjacent slots;
    a plurality of bend regions comprised of the electrically conductive material, wherein each of the bend regions is arranged around a respective one of the terminal ends of the slots, and wherein each pair of adjacent core segments is connected by a corresponding one of the bend regions; and
    an auxiliary conductive feature located within each of the bend regions proximate to the respective one of the terminal ends;
    wherein the plurality of slots electrically disconnect each pair of adjacent core segments from each other to create a serpentine current-carrying path that extends across the heater body through the electrically conductive material of the core segments and the bend regions, and
    wherein each of the auxiliary conductive features locally reduces an electrical resistance of the heater body in the bend regions in comparison to the electrically conductive material alone,
    wherein the electrically conductive material is shaped as an intersecting array of walls that define a plurality of cells in a honeycomb design,
    wherein each auxiliary conductive feature comprises a continuous strip of supplemental electrically conductive material, and
    wherein the strip comprises a plurality of wedges, each wedge partially filling a corresponding one of the cells.

2. The heater body of claim 1, wherein each auxiliary conductive feature further comprises filleted or radiused corners at the terminal ends of the slots.

3. The heater body of claim 1, wherein the wedges have a linear slope.

4. The heater body of claim 1, wherein the wedges are scalloped having a non-linear slope.

5. The heater body of claim 1, wherein the wedges increase in width across each cell from a minimum dimension of 0%-25% of a cell width to a maximum dimension of 25%-100% of the cell width.

6. The heater body of claim 1, wherein each auxiliary conductive feature further comprises a thickened border wall bordering the terminal end of the slot.

7. The heater body of claim 1, wherein each auxiliary conductive feature extends at least partially along a length of the slots.

8. The heater body of claim 7, wherein each auxiliary conductive feature extends at least partially along the length of the slots on both opposite sides of the slots.

9. The heater body of claim 7, wherein at least a portion of each auxiliary conductive feature that extends at least partially along the length of the slots is also spaced away from the slot.

10. The heater body of claim 1, wherein the auxiliary conductive feature extends continuously from a first core segment of the plurality of core segments through the bend region and to a second of the core segments of the plurality of core segments.

11. A heater assembly comprising the heater body of claim 1 coupled to a pair of electrodes at opposite ends of the serpentine path.

12. A heater body comprising:
an outer periphery;
a plurality of slots, each slot extending from the outer periphery and terminating at a terminal end within the heater body,
a plurality of core segments comprised of an electrically conductive material, each core segment defined between a different pair of adjacent slots;
a plurality of bend regions comprised of the electrically conductive material, wherein each of the bend regions is arranged around a respective one of the terminal ends of the slots, and wherein each pair of adjacent core segments is connected by a corresponding one of the bend regions; and
an auxiliary conductive feature located within each of the bend regions proximate to the respective one of the terminal ends;
wherein the plurality of slots electrically disconnect each pair of adjacent core segments from each other to create a serpentine current-carrying path that extends across the heater body through the electrically conductive material of the core segments and the bend regions,
wherein each of the auxiliary conductive features locally reduces an electrical resistance of the heater body in the bend regions in comparison to the electrically conductive material alone,
wherein the electrically conductive material is shaped as an intersecting array of walls that define a plurality of cells in a honeycomb design, and
wherein each auxiliary conductive feature comprises a continuous strip of thickened walls that are thicker than the intersecting walls.

13. The heater body of claim 12, wherein the thickened walls comprise multiple arms extending from the bend region toward each core segment.

14. An exhaust aftertreatment assembly comprising the heater assembly of claim 11 and an aftertreatment component connected in a common housing or piping.

\* \* \* \* \*